US007016363B1

(12) United States Patent
Reed et al.

(10) Patent No.: US 7,016,363 B1
(45) Date of Patent: Mar. 21, 2006

(54) SCALEABLE INTERCONNECT STRUCTURE UTILIZING QUALITY-OF-SERVICE HANDLING

(75) Inventors: Coke S. Reed, Princeton, NJ (US); John E. Hesse, Moss Beach, CA (US)

(73) Assignee: Interactic Holdings, LLC, Cranbury, NJ (US)

( * ) Notice: Subject to any disclaimer, the term of this patent is extended or adjusted under 35 U.S.C. 154(b) by 721 days.

(21) Appl. No.: 09/693,358

(22) Filed: Oct. 19, 2000

(51) Int. Cl.
*H04L 12/28* (2006.01)
(52) U.S. Cl. ............... 370/404; 370/406; 370/410; 370/408
(58) Field of Classification Search ........ 370/255–256, 370/400, 401, 408, 351, 404, 405, 406, 410
See application file for complete search history.

(56) References Cited

U.S. PATENT DOCUMENTS

| | | | | |
|---|---|---|---|---|
| 5,377,182 A | * | 12/1994 | Monacos | 370/219 |
| 5,617,413 A | | 4/1997 | Monacos | |
| 5,831,975 A | * | 11/1998 | Chen et al. | 370/256 |
| 5,996,020 A | * | 11/1999 | Reed | 709/238 |
| 6,272,141 B1 | * | 8/2001 | Reed | 370/404 |
| 6,289,021 B1 | * | 9/2001 | Hesse | 370/409 |
| 6,687,253 B1 | * | 2/2004 | Reed et al. | 370/406 |
| 6,754,207 B1 | * | 6/2004 | Hesse | 370/388 |

FOREIGN PATENT DOCUMENTS

| | | |
|---|---|---|
| WO | WO 97/04399 | 2/1997 |

OTHER PUBLICATIONS

Varvarigos, Emmanouel, A. and Bertsekas, Dimitri P., "Performance of Hypercube Routing Schemes with or Without Buffering," IEEE/ACM Transactions on Networking, IEEE Inc., New York, US, vol. 2, No. 3, Jun. 1, 1994, pp. 299-311.

* cited by examiner

*Primary Examiner*—Ricky Ngo
*Assistant Examiner*—Nittaya Juntima
(74) *Attorney, Agent, or Firm*—Koestner Bertani LLP; Ken J. Koestner

(57) ABSTRACT

An interconnect structure and method of communicating messages on the interconnect structure assists high priority messages to travel through the interconnect structure at a faster rate than normal or low priority messages. An interconnect structure includes a plurality of nodes with a plurality of interconnect lines selectively coupling the nodes in a hierarchical multiple-level structure. Data moves from an uppermost source level to a lowermost destination level. Nodes in the structure are arranged in columns and levels. Data wormholes through the structure and, in a given time-step, data always moves from one column to an adjacent column and while remaining on the same level or moving down to a lower level. When data moves down a level, an additional bit of the target output is fixed so data exiting from the bottom of the structure arrives at the proper target output port.

55 Claims, 10 Drawing Sheets

SCALEABLE INTERCONNECT STRUCTURE UTILIZING QUALITY-OF-SERVICE HANDLING

RELATED PATENTS AND APPLICATIONS

This application is related to U.S. Pat. No. 6,289,021, which is incorporated herein by reference in its entirety. This application is also related to and incorporates U.S. Pat. No. 5,996,020 herein by reference in its entirety.

The disclosed system and operating method are related to subject matter disclosed in the following co-pending patent applications that are incorporated by reference herein in their entirety:

1. U.S. patent application Ser. No. 09/693,359 entitled, "Scaleable Multi-Path Wormhole Interconnect", naming John Hesse as inventor and filed on even date herewith;
2. U.S. patent application Ser. No. 09/693,603 entitled, "Scaleable Interconnect Structure for Parallel Computing and Parallel Memory Access", naming John Hesse and Coke Reed as inventors and filed on even date herewith;
3. U.S. Pat. No. 6,687,253 entitled, "Scaleable Wormhole Routing Concentrator", naming Coke Reed and John Hesse as inventors and filed on even date herewith;
4. U.S. patent application Ser. No. 09/692,073 entitled, "Scaleable Apparatus and Method for Increasing Throughput In Multiple Level Minimuni Logic Networks Using a Plurality of Control Lines", naming John Hesse and Coke Reed as inventors and filed on even date herewith.

BACKGROUND OF THE INVENTION

A significant portion of data that is communicated through a network or interconnect structure requires priority handling during transmission.

Heavy information or packet traffic in a network or interconnection system can cause congestion, creating problems that result in the delay or loss of information. Heavy traffic can cause the system to store information and attempt to send the information multiple times, resulting in extended communication sessions and increased transmission costs. Conventionally, a network or interconnection system may handle all data with the same priority so that all communications are similarly afflicted by poor service during periods of high congestion. Accordingly, "quality of service" (QOS) has been recognized and defined, which may be applied to describe various parameters that are subject to minimum requirements for transmission of particular data types. QOS parameters may be utilized to allocate system resources such as bandwidth. QOS parameters typically include considerations of cell loss, packet loss, read throughput, read size, time delay or latency, jitter, cumulative delay, and burst size. QOS parameters may also be associated with an urgent data type such as audio or video streaming information in a multimedia application, where the data packets must be sent downstream immediately, or discarded after a brief time period.

What are needed are a system and operating technique that allow information with a high priority to communicate through a network or interconnect structure with a high quality of service handling capability.

SUMMARY OF THE INVENTION

In accordance with various embodiments of the present invention, an interconnect structure includes a plurality of nodes with a plurality of interconnect lines selectively coupling the nodes in a hierarchical multiple-level structure. Data moves from an uppermost source level to a lowermost destination level. Nodes in the structure are arranged in columns and levels. Data wormholes through the structure and, in a given time-step, data always moves from one column to an adjacent column and while remaining on the same level or moving down to a lower level. When data moves down a level, an additional bit of the target output is fixed so data exiting from the bottom of the structure arrives at the proper target output port.

Nodes of the structure have a plurality of input ports and output ports. Data entering one or more of the input ports moves down the structure thereby making progress to a target or goal specified in the data. Guidance of data through the structure is aided by control signals between nodes from nodes on a given level to nodes on a more uppermost level. A routing node on a given level can route a packet to a receiving node on a lower level provided that: (1) the node on the lower level is on a route leading to a target of the packet, and (2) the control signals to the routing node indicate that the receiving node is not blocked. In some embodiments, an additional condition is that the quality of service level of the packet is at least a predetermined level with respect to a minimum level of quality of service to descend to a lower level. The predetermined level depends upon the location of the routing node. The technique allows higher quality of service packets to outpace lower quality of service packets early in the progression through the interconnect structure. The technique is similar to seeding favorites in a race in the front row at the start.

In another embodiment, multiple data links connect between a pair of nodes with one of the links reserved for only high quality of service packets. In effect, the second high quality of service line serves as a passing lane for messages passing through the same route.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

DETAILED DESCRIPTION

Figure 1A:
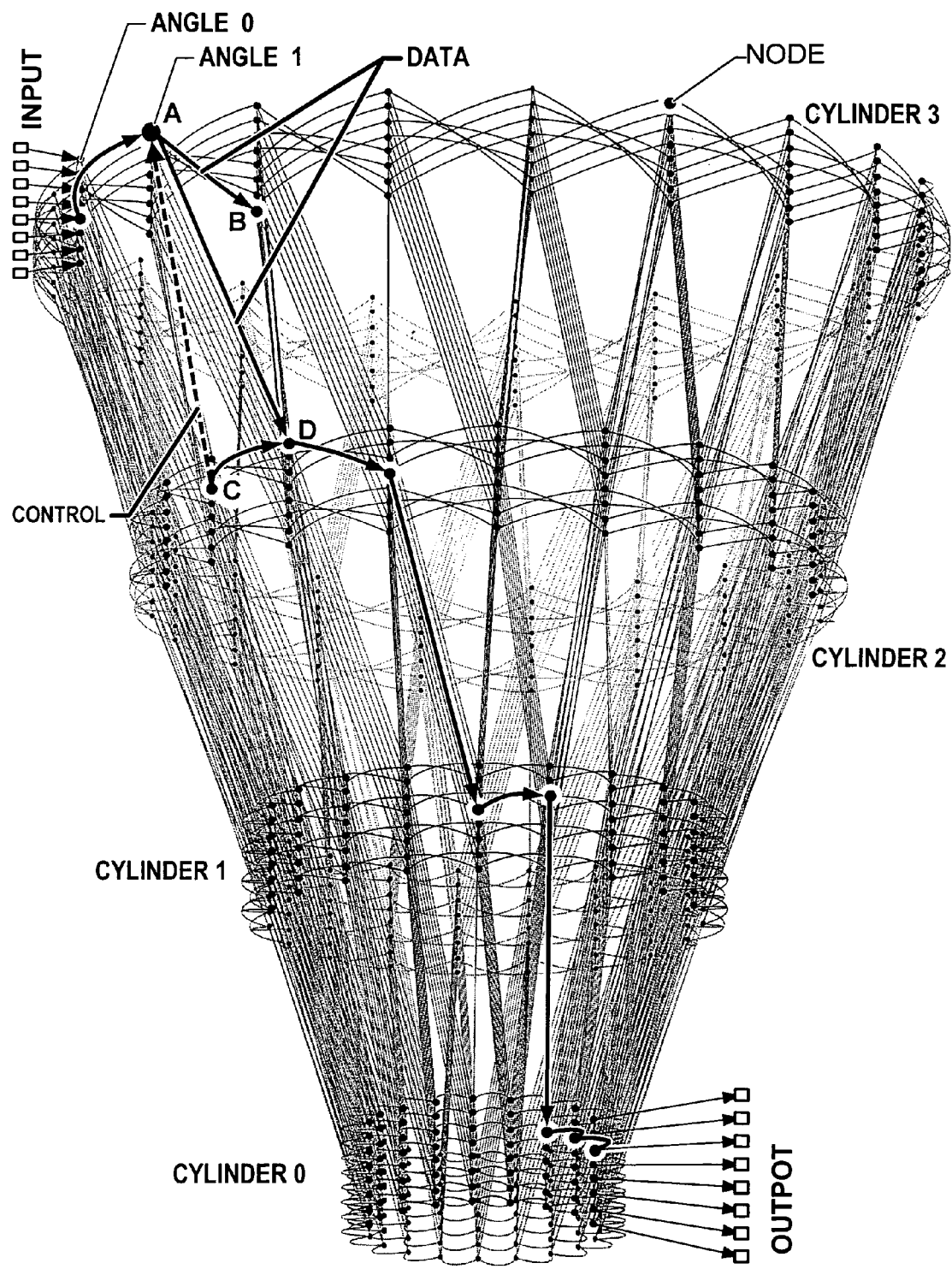
FIGS. 1A and 1B are schematic block diagrams illustrating connectivity among nodes that are adjacently communicative in a first interconnect structure that utilizes a communication structure according to the present invention.

Referring to FIG. 1A, a schematic pictorial diagram illustrates a four-cylinder, eight-row network that exemplifies the multiple-level, minimum-logic (MLML) networks taught in U.S. Pat. No. 5,996,020. Data in the form of a serial packet enters the network at input terminals located at an outermost cylinder, shown as cylinder 3 at the top of FIG. 1A. Data packets move from node to node towards a target output port that is specified in the header of the packet. The description hereinafter refers to messages or data in terms of data units, typically in serial form, such as an interconnect protocol (IP) packets, Ethernet frames, ATM cells. Data may otherwise be termed switch-fabric segments, typically a portion of a larger frame or data packet, parallel computer inter-processor messages, or other data or messages that are limited in length. Data messages in the form of packets always move to a node at the next angle, and either stay at the same cylinder or move to a more inward cylinder. A packet may move to a more inward cylinder, shown at the lower level in FIG. 1A, whenever such a move takes the packet closer to the target output port.

The network has two kinds of transmission paths: one for carrying data packets, and another for communicating control information. A node accepts data from a node on the same cylinder or from a cylinder outward from the node's cylinder, and sends data to node on the same cylinder or to a cylinder inward from the node's cylinder. Packets move in uniform rotation around the central axis in the sense that the first bit of a packet at a given level uniformly moves around the cylinder. When a message bit moves from a cylinder to a more inward cylinder, the message bits synchronize exactly with messages at the inward cylinder. Data can enter the interconnect or network at one or more columns or angles, and can exit at one or more columns or angles, depending upon the application or embodiment.

A node sends control information to a node at a more outward positioned cylinder and receives control information from a node at a more inward positioned cylinder. Control information is transmitted to a node at the same angle. Control information is also transmitted from a node on the outermost cylinder to an input port to notify the input port when a node on the outermost cylinder that is capable of receiving a packet from the input port is unable to accept the packet. Similarly, an output port can send control information to a node on the innermost cylinder whenever the output port cannot accept a packet. A node receives a control signal from a node on a more inward positioned cylinder or an output port. The control signal informs the recipient of the control signal whether the recipient may send a message to a third node on a cylinder more inward from the cylinder of the recipient node.

In U.S. Pat. No. 5,996,020 the terms "cylinder" and "angle" are used as a reference to position. The terms are analogous to "level" and "column," respectively, used in U.S. Pat. No. 6,289,021, and in the present description.

Figure 1B:
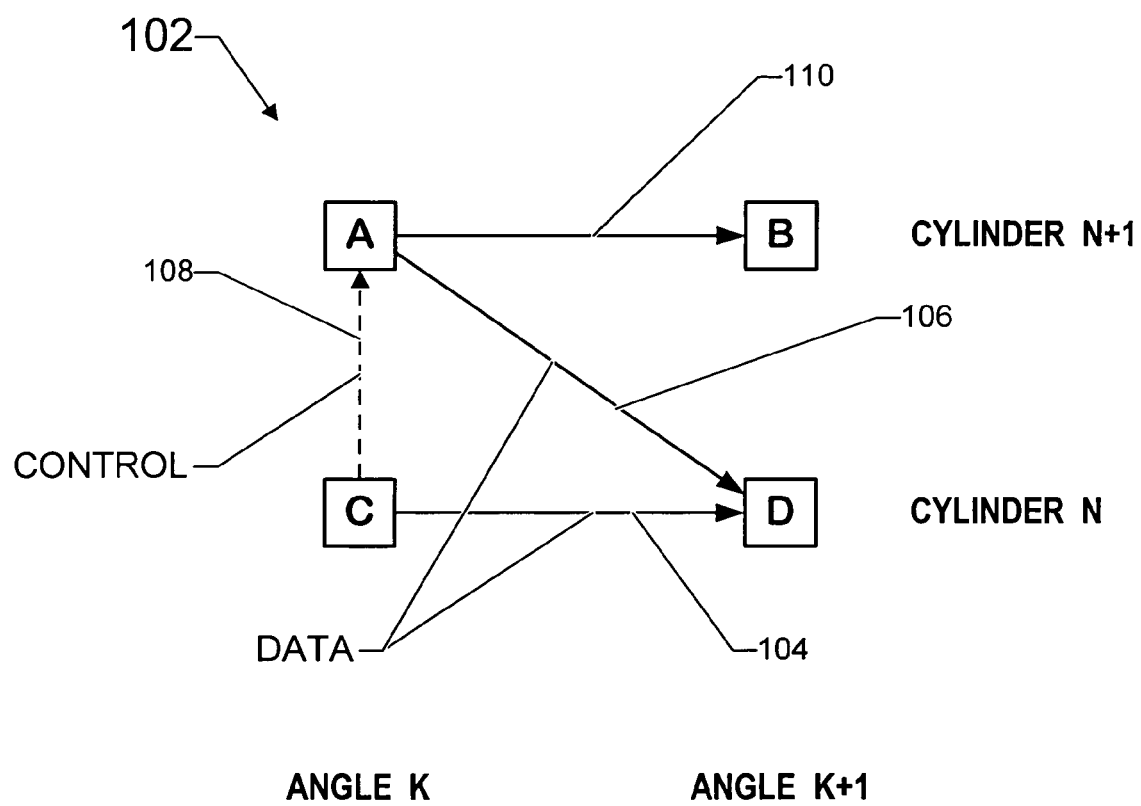

Referring also to FIG. 1B, the interconnect structure 102 includes nodes A and B on one cylinder, and nodes C and D on another cylinder. Nodes A and C are at the same angle. Nodes B and D are at the same angle that is different from the angle of nodes A and C. Node A is capable of sending data packets to node B on path 110 and to node D on path 106. Node C can send control signals to node A on path 106 to enforce the priority for node C to send data packets to node D, over the priority for node A to send data packers to node D. In the example of the interconnect structure 102, node A can send data packets directly to node D without the packets passing through another node.

Figure 2A:
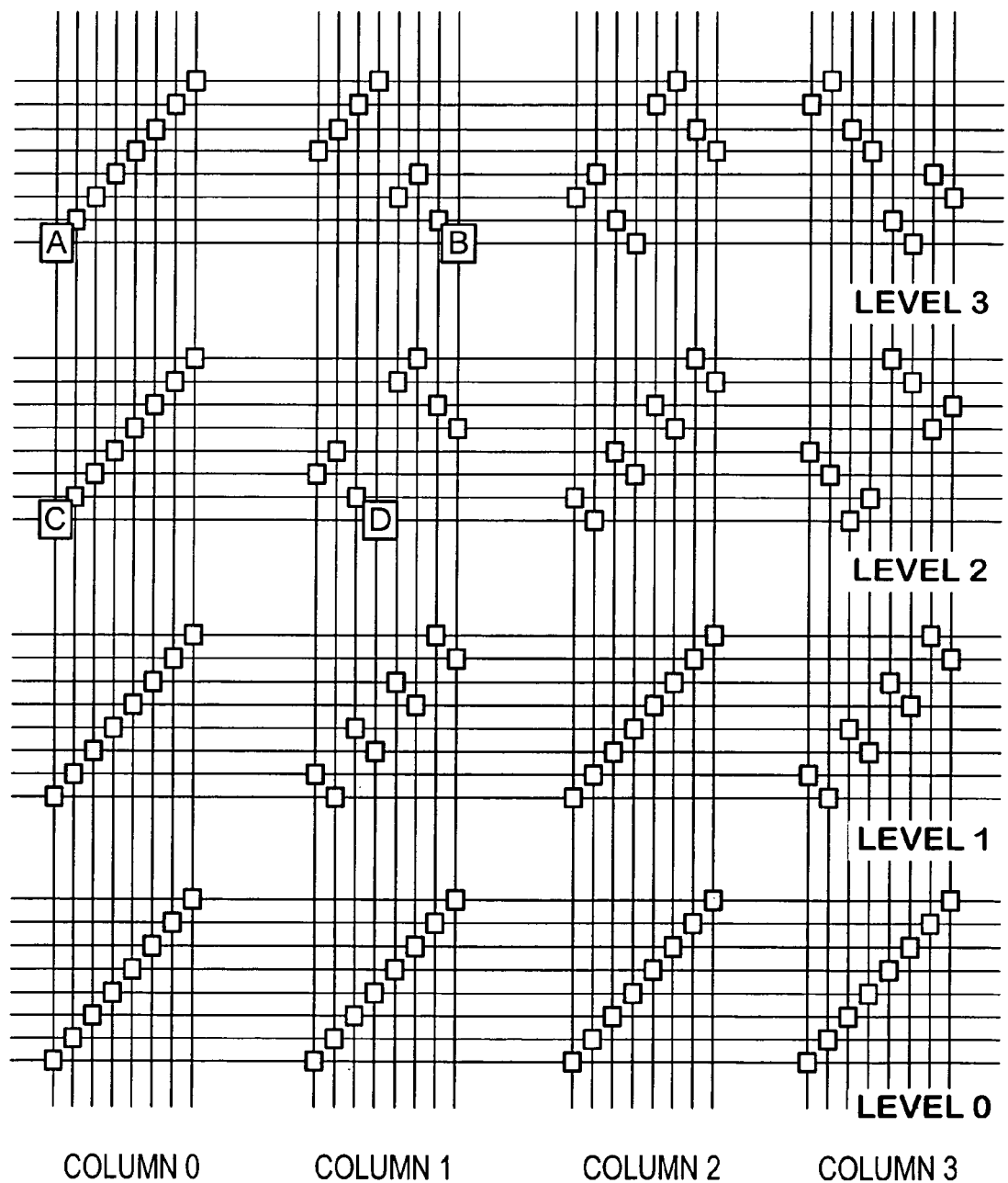
FIGS. 2A and 2B are schematic block diagrams that illustrate connectivity among nodes that are adjacently communicative in a second interconnect structure that utilizes a communication structure and method according to the present invention.
Figure 2B:
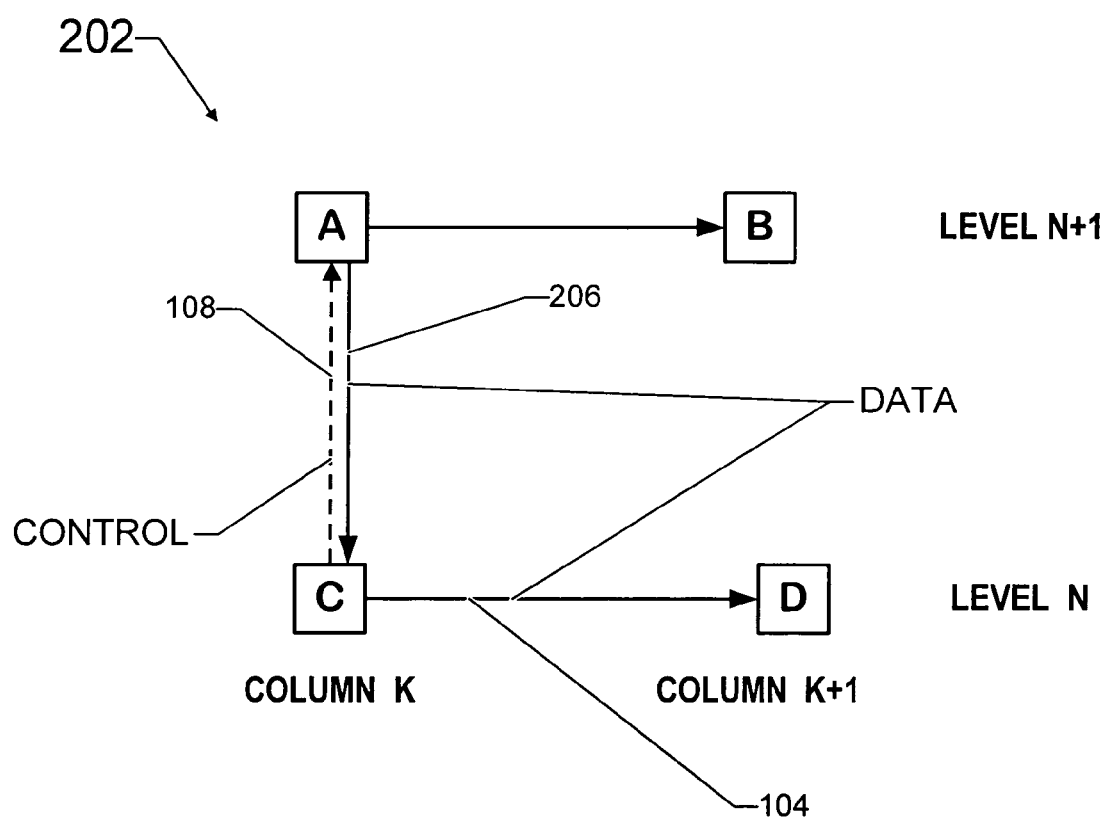

Referring to FIGS. 2A and 2B, schematic block diagrams illustrate connectivity among nodes in a second example of an interconnect structure discussed in U.S. patent application Ser. No. 09/693,359. As in FIGS. 1A and 1B, a relationship exists among four nodes A, B, C, and D. Nodes A and B are on one level and nodes C and D are on another level. Nodes A and C are in the same column and nodes B and D are in the same column different from the column of A and C. Node C has priority over node A to send data to node D on path 104. In structure 202 as in structure 102, when node C sends a packet to node D on path 104, node C also sends a control signal on path 108 to node A to enforce the priority of node C over node A to send a packet to node D on path 104. In the illustrative examples, nodes A and C do not simultaneously send packets to node D. Therefore, in the absence of a control signal, the common data path 104 from node C to node D is open and node A can send a packet to node D through node C using the data path 104 from node C to node D. The node C is not able to route a packet entering node C on the link 206 from node A to node C. Packets traveling on the data line from node A to node C are always forwarded from node C to node D. Therefore, the layouts shown in FIGS. 1A and 2A are physically different while logically equivalent for sending packets and control signals between the nodes A, B, C and D. Similarly, the layouts shown in FIGS. 1B and 2B are physically different and logically equivalent.

Quality of service techniques disclosed herein apply to logically equivalent structures such as those taught in the incorporated patents.

Figure 3A:
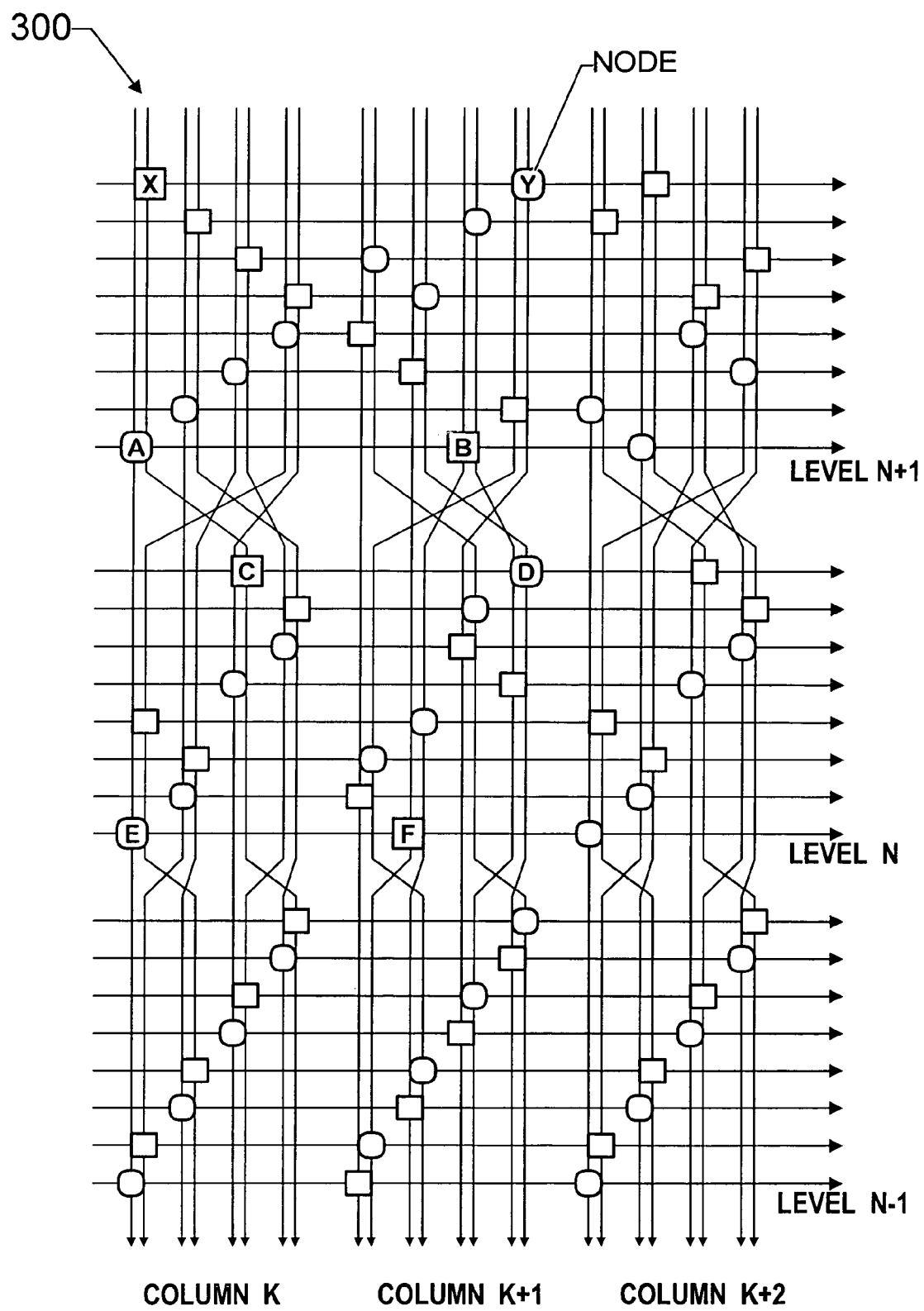
FIGS. 3A, 3B, and 3C depict third and fourth examples of interconnect structures that support quality of service handling of a type discussed in U.S. Pat. No. 6,289,021, and can be modified to support new kinds of quality of service described hereinafter.
Figure 3B:
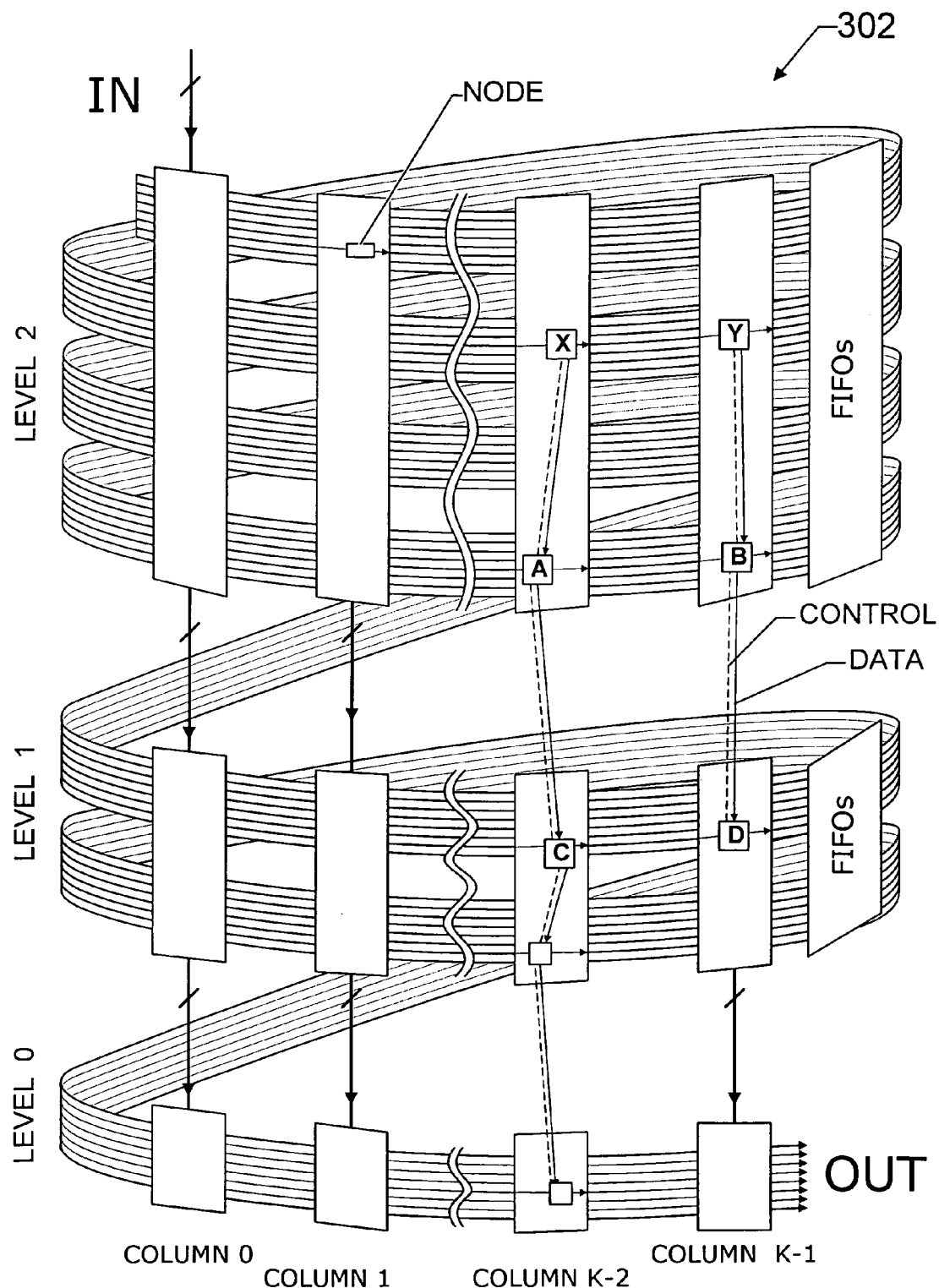

FIGS. 3A and 3B depict third and fourth examples of interconnect structures that support QOS handling. FIG. 3A depicts a portion of a network structure taught in U.S. Pat. No. 6,289,021 and U.S. patent application Ser. No. 09/693, 359, which has a more complex arrangement of nodes and interconnections, for the propose of greater transmission efficiency. FIG. 3B depicts a concentrator taught in U.S. Pat. No. 6,687,253.

The structures illustrated in FIGS. 3A and 3B include four nodes A, B, C and D that send packets and control signals as described for the nodes A, B, C, and D shown in FIGS. 1A, 1B, 2A, and 2B. FIG. 3A also include four additional nodes X, Y, E and F. Like nodes A and B, nodes X and Y are on level N+1. Like nodes C and D, nodes E and F are on level N. The nodes A, C, E and X are in column K. Nodes D, B, F and Y are in column K+1. FIG. 3B shows a structure with two nodes X and Y on the same level as nodes A and B.

Figure 3C:
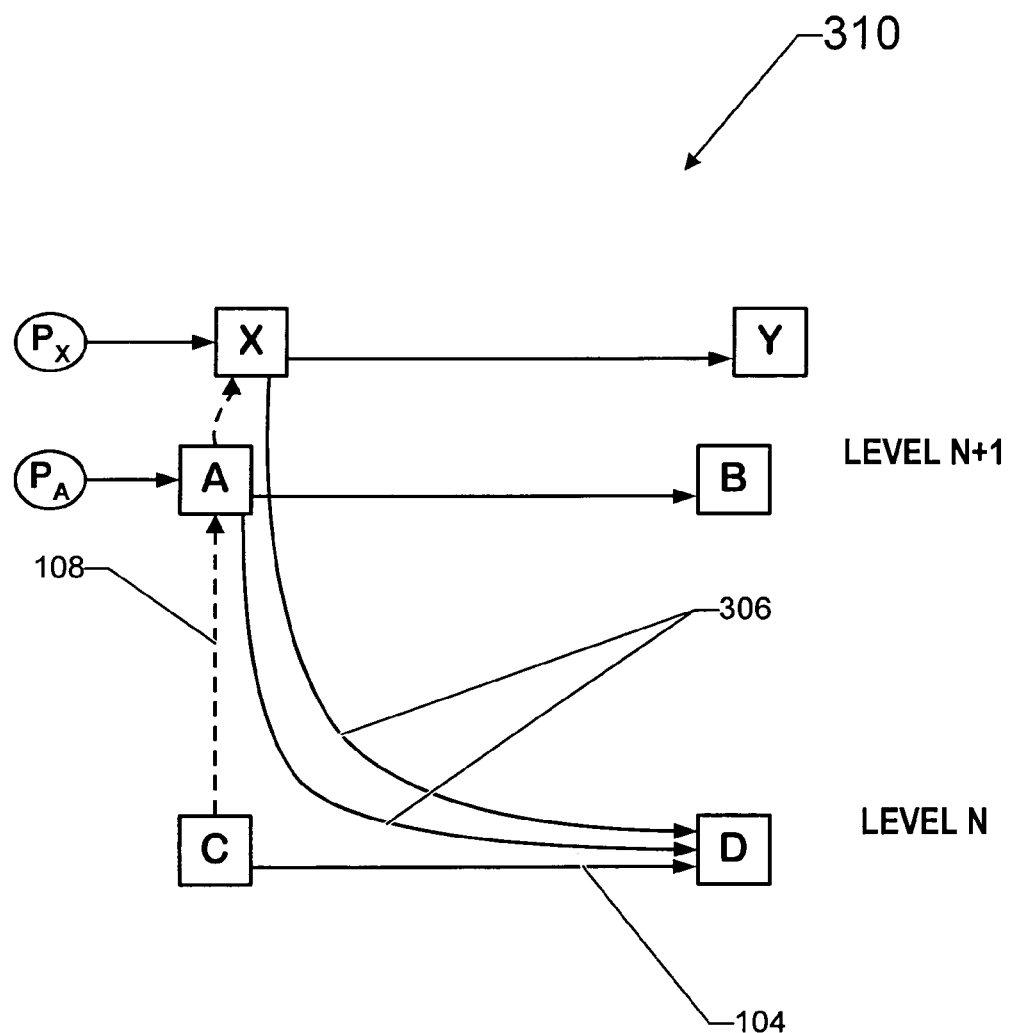

Nodes C, A, and X are all capable of sending packets to node D. Node C has priority over nodes A and X to send packets to D. Moreover, in structures 300 and 302 node A has priority over node X to send packets to node D. The priorities are enforced by control signals traveling through control line 108. The logical relationships of the six nodes A, B, C, D, X and Y are illustrated in FIG. 3C. The simplified schematic block diagram of FIG. 3C shows the fundamental building-block interconnect structure for describing quality of service handling in larger interconnect structures such as those shown in FIGS. 3A and 3B.

In one category of embodiments, path 306 connecting nodes A and X to node D connects diagonally as shown in structure 310 of FIG. 3C. In another category of embodiments, the connections from nodes A and X to node D pass through node C as shown in structure 302 of FIG. 3B.

Figure 5A:
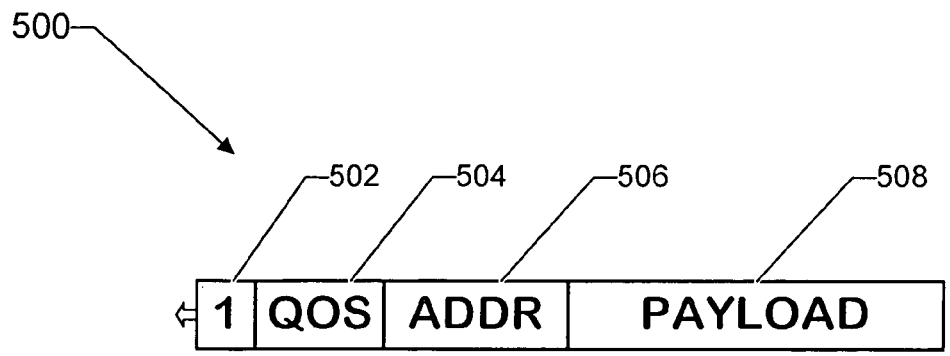
FIGS. 5A, 5B, and 5C depict data structure diagrams that show the format of data carried through the interconnect structure in the form of packets, including a quality of service (QOS) field.

FIG. 5A shows the layout of a data packet 500 with a quality-of-service (QOS) field 504. Typically, the QOS field is constant for a particular packet. In some embodiments, the QOS field does not remain constant as the message passes through the interconnect structure. Instead a portion of the QOS field includes a sub-field for storing information concerning when the packet entered the interconnect structure. If the packet remains in the interconnect structure longer than a determined duration, the QOS field can be modified as a function of elapsed time. Another portion of the QOS field may store a value that indicates a particular level of service quality for a system supporting multiple levels of quality-of-service. In one example, a particular QOS level is indicated by a non-negative integer value. The larger the integer value, the higher the QOS.

The packet 500 has a Bit field 502 that has the value 1, which is used by nodes to detect the presence of an arriving packet in preferred embodiments of an interconnects discussed herein. The packet contains a payload field 508. In interconnects that serve as network switching fabrics, the address field 506 specifies the output port or set of address ports to which the packet is directed. The concentrator illustrated in FIG. 3B has no address field.

Figure 5B:
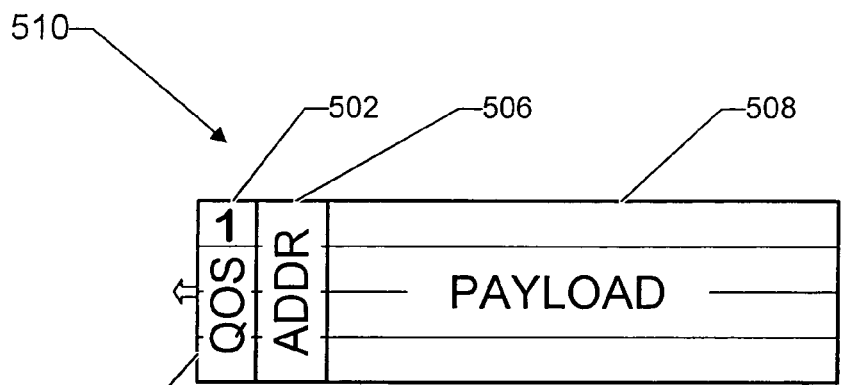

FIG. 5B depicts a format of a packet where a plurality of bits are transmitted through the structure in parallel, reducing the length of packet 510 by increasing the packet width in comparison to the packet layout 500 shown in FIG. 5A. The reduced-length packet 510 advantageously communicates the full QOS field in fewer time steps. Parallel transfer of message bits lowers latency by reducing the number of time steps to wormhole route a packet through the interconnect structure. A low latency embodiment can use a bus structure to convey packets 510 over multiple path data carrying lines. In the illustrated example of a bus-format packet 510, the Bit field and the QOS field enter a node at the same time. The receiving node advantageously receives all of the packet priority information that is used to route the message in a shorter time. A pin-limited integrated circuit chip implementation may not have sufficient input lines to insert an entire packet into the chip so that the entire packet is communicated on a wide bus. The interconnect structure can be controlled to operate with a portion of a packet moving in parallel and a portion moving serial bit-by-bit. For example, a portion of the header can be inserted sequentially into a buffer and the packets then moved through the interconnect structure with a portion of the header moving in parallel and the remainder of the packet moving serially bit-by-bit.

Figure 5C:
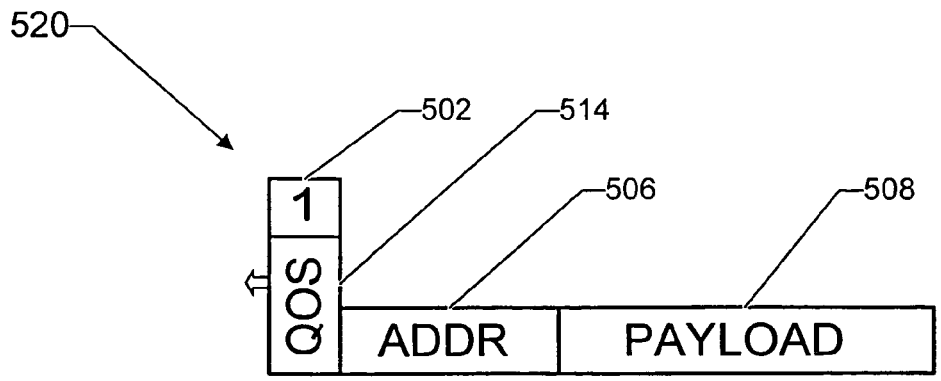

FIG. 5C depicts a format of a packet 520 where the Bit field 502 and the QOS field 514 enter a node at the same time while the remaining bits of the packet, specifically the address field 506 and the payload field 508, pass through the structure serially.

Referring to any of FIGS. 3A, 3B, and 3C, node D on level N receives data from one node C on level N and from two nodes A and X on level N+1. A method for using quality of service (QOS) information stored in the header is described in U.S. patent application Ser. No. 09/693,359. Node C always has priority over node A and node X to send packets to node D.

One aspect of the interconnect structures described herein and in the patents and applications incorporated by reference is priority to resolve conflicts or collisions of messages that attempt to pass through the same node or cell simultaneously. Priority is resolved based on the relative position of nodes in the hierarchy. Priority based on position gives node A priority over node X to send packets to node D unless a higher priority packet PX at node X is targeted for node D and a lower priority packet PA at node A is targeted for node D. In this condition, packet PX is seat to node D and the packet PA is deflected to node B as described in U.S. patent application Ser. No. 09/693,359. The reference also discloses similar techniques for nodes that are connected into multiple cells. In the disclosure herein, quality of service processing is extended by additional techniques assuring that high QOS messages move more rapidly through the interconnect structure than lower QOS messages.

Threshold QOS for Changing Levels

One technique that expands quality of service processing for hierarchical networks is assignment of a threshold QOS level $T_{QOS}$ to individual nodes in the interconnect structure for sending to a particular other node. For example, a node A on a level (for example N+1) is assigned a threshold QOS level $T_0(A,D)$ for sending a message to the node D on a lower level. The node A is not allowed to send messages with QOS less than $T_0(A,n)$ to a node n on a lower level.

Threshold QOS for changing levels is effective, for example, in applications in which the interconnect structure has only one column for injecting packets into the system from outside the system. For example, one such structure has L+1 levels and K columns with the levels enumerated L, L-1, . . . 0 from the highest level to the lowest level and the columns enumerated 0, 1, 2, . . . K-1. For a node U on the top level L in one of the first few columns positioned to route data to a node V on a lower level, the QOS threshold $T_0(U, V)$ is set high. For a node U' on the top level but several columns to the right of column 0, positioned to route data to a lower level node V', the threshold $T_0(U', V')$ is less than threshold $T_0(U, V)$. For nodes in columns further to the right and lower in the structure (nodes with higher enumeration of column K and lower enumeration of column L), thresholds are further reduced. For some nodes U" positioned to send data to nodes V" on lower levels, the threshold $T_0(U", V")$ is set to zero. In case the QOS levels are all represented by non-negative values, the setting of the threshold to zero imposes no limitation to the flow of data from node U" to node V". The strategy allows the highest QOS packets to move to an area where they are not blocked by packets with lower QOS levels and allows other packets to quickly move down the levels after the first few columns.

The variable threshold scheme can operate in conjunction with a technique for discarding selected packets. Some communication networks have a special bit reserved in the quality of service field that serves as a discard bit. When the discard bit in a packet is set to a discard state, the packet is discarded when the network becomes congested. Packets with the discard bit set have the lowest QOS and are forced to stay on the top level L longest. The packets are allowed to leave the top level L at a column J less than K. If a packet remains in the top level L until reaching column K, the packet is discarded. Threshold QOS handling for changing levels is highly useful for networks and concentrators described in the patents and applications that are incorporated by reference.

The proper setting of threshold value $T_0(P, Q)$ for nodes P and Q depends on network traffic statistics. The threshold value $T_0(P, Q)$ values can be loaded into the memory and changed, if desired. The ability to change threshold value is highly advantageous when traffic statistics change.

Multiple Data Links to Handle QOS

Figure 4A:
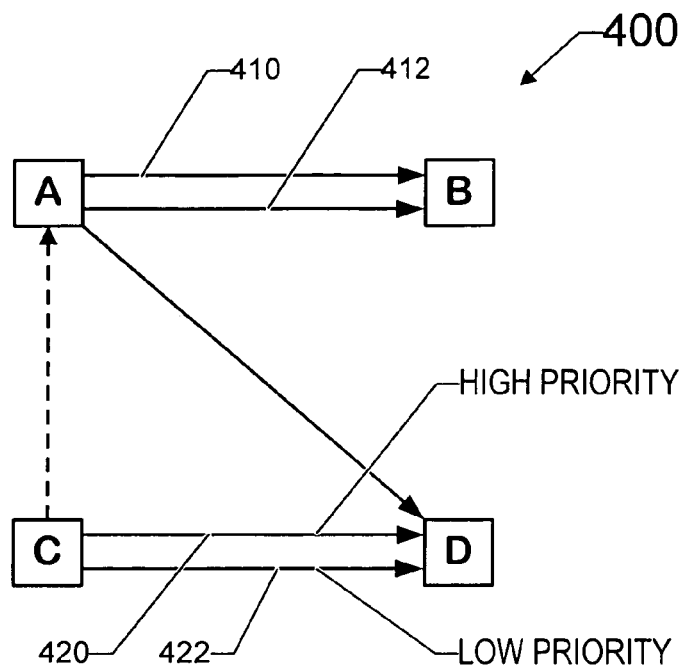
FIGS. 4A, 4B, and 4C illustrate fundamental interconnections among nodes that support quality of service handling in which the number of interconnects between nodes is increased to permit high priority data to attain a priority over lower priority data.
Figure 4B:
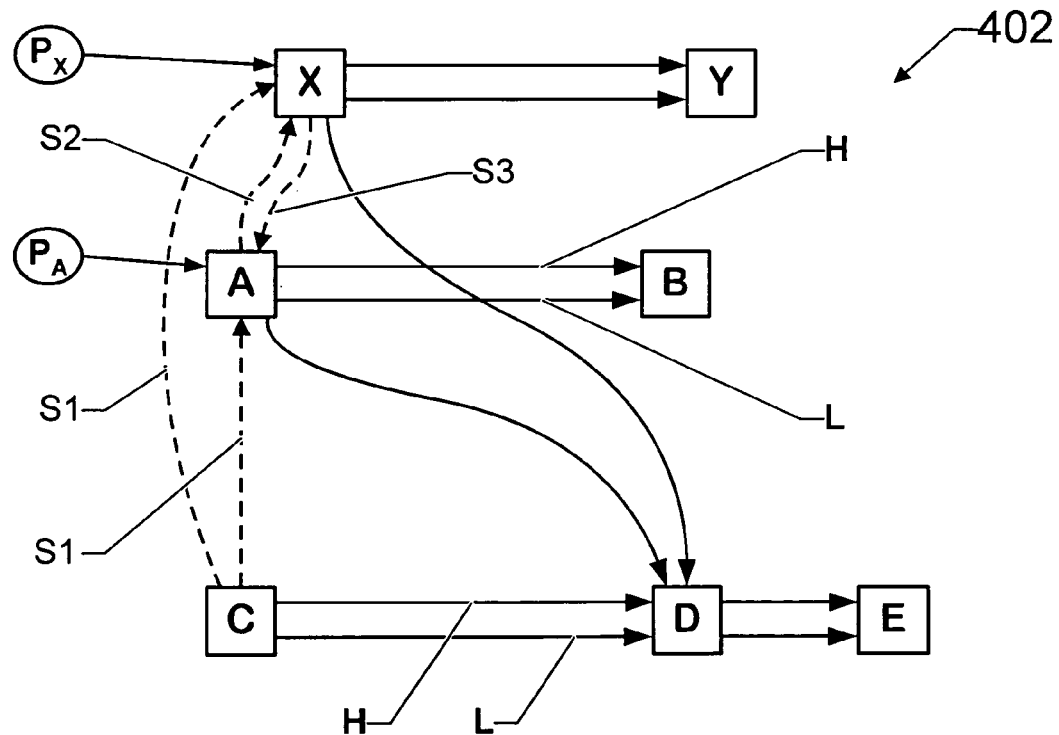

FIGS. 4A and 4B illustrate fundamental multiple interconnections among nodes for usage in quality of service handling. A plurality of packets may arrive at a node having a plurality of quality-of-service priorities. In general, the technique is employed in an interconnect structure that includes two or more data-carrying lines between nodes as illustrated in interconnect structures 400 and 402. The structures disclosed in the patents and applications incorporated by reference herein and shown in FIGS. 1A, 1B, 2A, 2B, 3A, 3B, and 3C can be modified to implement quality of service handling by replacing the single interconnect lines between nodes with two or more interconnect lines. The two or more lines are then selectively used to communicate data according to QOS considerations.

Referring to FIG. 4A, a schematic block diagram shows connectivity among nodes including a modification to the first interconnect structure shown in FIGS. 1A and 1B, which are logically the same as structures shown in FIGS. 2A, 3A, and 3B. An interconnect structure is modified by increasing the number of interconnect lines between nodes to permit higher priority data to attain priority over lower priority data. The interconnect structure 400 includes two data-carrying lines between nodes on the same level. A first data-carrying line carries higher priority data. A second data-carrying line carries both high priority data and low priority data, and is referred to as a lower priority line. Illustratively, on a first level a higher priority data-carrying line 410 and a lower priority data-carrying line 412 from node A are connected to node B. Similarly, on a second level a high priority data-carrying line 420 and a low priority data-carrying line 422 from node C are connected to node D.

FIG. 4B shows four nodes A, B, C, and D of the modified interconnect structure 402 and shows additional nodes X, Y and E that are outside the group of four nodes. Generally, the nodes X, Y and E each may be considered to be nodes within other groups of four nodes. Node X is positioned on the same level as node A and is capable of sending messages to the nodes D and Y. Node C is connected to node D by a first line H and by a second line L. The first line H is used exclusively for carrying higher quality-of-service packets. The second line L is used for carrying both higher and lower quality-of-service packets. Node E is positioned on the same level in the hierarchy as node D and is positioned to receive messages from node D. Node Y is positioned on the same level as node X.

A technique for supporting quality-of-service transmission priorities is disclosed with reference to FIGS. 4A and 4B. In one example of the technique, two data-carrying lines are connected between two directly connected nodes on the same level. For example, node C and node D are connected by two data-carrying lines including a first line H and a second line L. The first line H exclusively carries high priority quality of service (HQOS) packets. The second line L carries both high priority quality of service (HQOS) packets and low priority quality of service (LQOS) packets. In any time period, five cases are possible:

(1) No packets are passing from node C to node D;
(2) Only one LQOS packet passes from node C to node D and the packet is carried on the second line L;
(3) Only one HQOS packet passes from node C to node D and the packet is carried by the first line H,
(4) One HQOS packet is carried by the first line H from node C to node D and one LQOS packet is carried by the second line L from node C to node D, or
(5) Two HQOS packets are carried from node C to node D, one packet on the first line H and one packet on the second line L.

At no time are two low-priority quality-of-service (LQOS) packets allowed to pass from node C to node D.

Referring to FIG. 4B, quality of service control is based on a method routing packets through nodes of the interconnect structure. For example, at a packet arrival time and based on a condition at node C, node C sends a control signal S1 to nodes A and X. The control signal S1 indicates that one of the following four conditions holds at C.

(1) Node C is sending no packets to node D,
(2) Node C is sending one packet to node D on line L and no packets to node D on line H,
(3) Node C is sending one packet to node D on line H and no packets to node D on line L, or,
(4) Node C is sending two packets to node D.

At a particular time period, nodes A and X receive the control signal S1 from node C and simultaneously or nearly simultaneously, the two nodes A and X each either:

1) receive no packets;
2) receive one packet; or
3) receive two packets.

The received packets arrive from a node or nodes outside the group illustrated in FIG. 4B. The simultaneous or near simultaneous timing is discussed extensively in U.S. Pat. No. 5,996,020, U.S. Pat. No. 6,289,021, and U.S. patent application Ser. No. 09/693,359. Following the particular time period for the reception of packets by node A and node X, node A sends a control signal S2 to node X, and node X sends a control signal S3 to node A.

The control signal S2 from node A to node X takes a value according to the following logical statement. If a packet M arrives at node A such that a path exists through mode D to an acceptable output port for the packet M, then node A sends a control signal S2 to node X. The control signal S2 indicates the highest level of quality of service of all such packets M. If no packet M arrives at node A such that a path exists through node D to an acceptable output port for packet M, then node A sends a control signal, for example the integer 0, indicative of the packet status. In the case of a network interconnect, an output port is acceptable for the packet M provided that the header of M designates the output port. In the case of a concentrator, all output ports are acceptable.

Node X sends a similar control signal S3 to node A that indicates whether a packet M has arrived at node X such that a path exists through node D to an acceptable output port of packet M. If the control signal S3 indicates that such a packet M has arrived, the control signal S3 indicates the highest QOS number of all such packets.

If the nodes shown in FIG. 4B are a part of a network of the types illustrated in FIGS. 1A, 2A, or 3A, then headers of packets M contain target output port information field 506. The output port information enables nodes A and X to ascertain whether a path exists through node D that leads to a target output port of packet M. If the nodes shown in FIG. 4B are a part of a concentrator of the type illustrated in FIG. 3B then for every packet M a path exists from node D to an acceptable output port of the packet M.

A quality of service threshold can be assigned for nodes in the interconnect structure on a node-by-node basis. The threshold values can be permanently set, for example hard wired, into the node, or the threshold values can be stored in the nodes and changed from time to time. For example for a node A positioned to send packets to node D, a number $T_1(A,D)$ is a threshold value so that packets must have a level of QOS at least $T_1(A,D)$ to be considered by node A to be HQOS packets. Packets P with a QOS level at least as high as the threshold $T_1(A,D)$ are considered by node A to be HQOS packets for sending data to node D.

In cases that node A is required to send a HQOS packet to node D, packets with QOS level at least $T_1(A,D)$ may be sent. Packets with a QOS level lower than $T_1(A,D)$ are considered by node A to be LQOS packets for sending data to node D. With reference to FIG. 4B, quality of service is determined from the perspective of the transmission line.

When node D sends two packets to node E and the packets have different levels of quality of service, then node E places the packet with the higher QOS level on line H. If two packets are sent from node C to node D, and node D does not route either of the packets to a node F (not shown) on a lower level, then both packets will be sent by node D to node E, even in the case neither packet meets $T_1(A,D)$ threshold QOS criteria. Stated differently, if a given packet P, meeting a quality of service value at a node U enters a HQOS line connecting two nodes on the same level, then packet P will continue to stay on the HQOS line while passing from node to node down a row. When packet P drops to a lower level from node R to node S, packet must meet the QOS criterion applied for using the link from node R to node S.

Referring to FIG. 4B, the minimum QOS for changing levels from node A to node D is set equal to the minimum QOS for changing levels from node X to node D, expressed mathematically by the equation $T_0(X,D)=T_0(A,D)$. A packet P at node A or node X is a candidate to be sent to node D if: 1) the level of QOS of packet P is at least $T_0(A,D)$; and 2) a path exists through node D to an acceptable output port for packet P. If any candidate packets are present at node A or node X for sending to node D, then a message set R can be defined as the set of packets that are candidates for sending from the node A or the node X to the node D. If the set R has many entries, then a most favored packet of set R to be sent to node D is denoted packet P1. TMAX designates the highest QOS level of all packets in set R. If a packet P is positioned at node A and packet P has a QOS level TMAX, then one packet P at node A that meets the QOS level TMAX is designated as packet P1. If no packet with QOS level TMAX is positioned at node A, then a packet positioned at node X with the QOS level TMAX is designated as packet P1. If a most favored packet P1 is positioned to be sent to node D and members of set R are present at both node A and node X, then a second most favored packet is available to be sent to node D. The second most favored packet is denoted packet P2. If packet P1 is positioned at node A, then packet P2 is a packet at node X with the highest QOS level. If packet P1 is positioned at node X, then packet P2 is a packet positioned at node A with the highest QOS level.

If more than one packet positioned at node A has a QOS level equal to TMAX then the packet at node A that is most favored, designated P1, is selected in the following manner. If in a first case, a packet P arriving at A has level of QOS TMAX and packet P was routed to node A by a node on the same level as node A on line H, then packet P is designated P1. If the first case does not occur and a packet P arrives at node A from a node on the same level as node A on line L, then packet P is designated P1. If the first two cases do not occur, then the packet P arriving at node A from the node on a higher level with priority to send to node A must have a QOS level equal to TMAX, and the packet P is designated P1. The packet is granted most favored packet status based on the QOS header field packet and also based on the node last visited prior to arrival at node A. The scheme for choosing P1 and P2 is one example of the many possible techniques. One having ordinary skill in the art can choose a wide variety of techniques for choosing the most favored packets.

If no packet at node A has a QOS level equal to TMAX then the packet with most favored status is a packet positioned at node X. If two packets at node X have level of QOS TMAX, then the rules stated hereinbefore apply for granting most favored status. The rules stated hereinbefore based on last-visited node apply to the assignment of P2 status to a packet.

If at nodes A and X, no candidate packets are available for sending to node D, then no packets travel from node A to node D. If at node A or node X a candidate is available for sending to node D, then a most favored candidate packet P1 is always present. In case a candidate packet is present for sending to node D, then one or more messages will be sent to node D based on the control signal sent from node C. When at least one candidate packet is present, the packet selected for sending is based on which of the following conditions occurs:

1) The control signal from node C to nodes A and X indicates that node C routes no packets to node D. In this case packet P1 is routed to node D. In case the level of QOS of packet P1 is at least $T_1(A,D)$ and a second most favored packet P2 is present. Packet $P_2$ is also sent to node D.
2) The control signal from node C to nodes A and X indicates that node C routes one packet to node D on line L and no packet to node D on line H. In this case packet P1 is routed to node D if the level of QOS of packet P1 is at least $T_1(A,D)$ and no other packet from node A or node X is routed to node D.
3) The control signal from node C to nodes A and X indicates that node C routes one packet to node D on line H and no packet to node D on line L. In this case packet P1 is routed to node D and no other packet from either node A or node X is routed to node D.
4) Node C sends one packet to node D on line H and one packet to node D on line L. In this case, no packet is sent from node A or node X to node D.

The techniques described herein can be modified using the techniques of U.S. patent application Ser. No. 09/692,073. One such modification to the techniques described herein is the following.

If the following three conditions occur:
1) Node C sends a packet P to the node D;
2) Control information CS is sent to node C from nodes on a level below node C;
3) Control information CS indicates that the node D will route packet P to a node W distinct from the node E;

Then node C will send a control signal CS to node A and node X indicating a non-blocking condition on a line from node D to node E. In this case, the control signal CS is determined in part on the routing of data by node D.

One having ordinary skill in the art will be able to combine the techniques disclosed herein with the techniques taught in U.S. patent application Ser. No. 09/692,073 to increase throughput of data at a node.

Figure 4C:
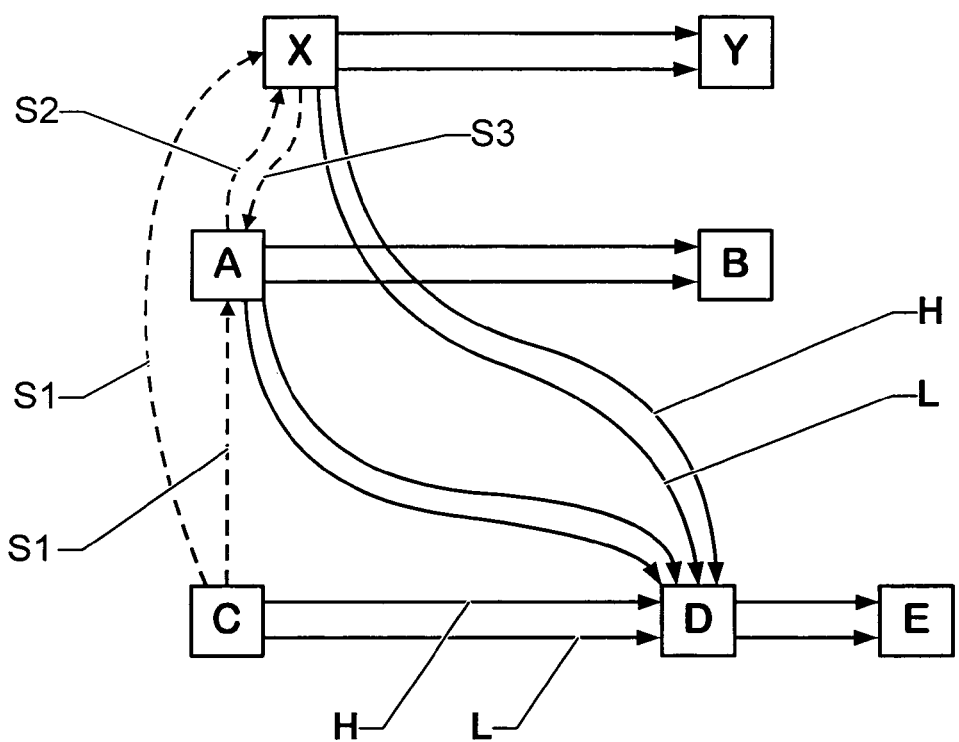

Referring also to FIG. 4C, an additional data carrying line connects between nodes A and D, and additional data carrying line connects between nodes X and D. The additional lines permit additional possible cases. At a given packet-arriving time interval, one case is described as follows:

1) two or more candidate packets for sending to node D arrive at node X;
2) no candidate packet for sending to node D arrives at node A;
3) a packet P arriving at node X is a candidate for sending to node D and the QOS level of packet P is at least $T_1(X,D)$; and
4) the node C does not send any packets to node D.

In the enumerated case, the packets P and Q can both travel to node D. All other possible cases can be enumerated and a rule governing the packets in each of the cases can be prescribed based on QOS priority. In still other embodiments, more than two lines can connect nodes so that more than two levels of quality of service are possible. One having ordinary skill in the art can use the described techniques to modify all interconnect structures described in the patents and applications that are incorporated by reference herein.

Networks with multiple data interconnect lines between the nodes can also be used that do not support quality of service. In one embodiment, all packets passing through the structure can be considered HQOS packets, increasing throughput over single-line embodiments and reducing the number of hops through the interconnect structure at the expense of additional logic at the nodes and more interconnect lines between the nodes.

Numerous interconnect structure embodiments are described in U.S. Pat. No. 5,996,020, U.S. patent application Ser. No. 09/009,703, and U.S. patent application Ser. No. 09/693,359. One having ordinary skill in the art can implement the QOS techniques described herein in any or all of the numerous interconnect structure embodiments.

In Summary, three examples of methods for supporting quality of service are described:
1) A method first taught in U.S. Pat. No. 6,289,021 in which nodes A and X on level N+1 contend to send a packet to a third node D on level N. Contention is first resolved by quality of service and second by position.
2) A method described herein in which a node N can send a packet M to a lower level provided that the QOS level of packet M meets the minimum threshold of node N to send packets to lower levels.
3) A method employing multiple data carrying lines between nodes in which one of the lines is used only for high quality of service (HQOS) level packets.

The various techniques can be used singly or in combination to design systems fitting a wide variety of needs.

In a Wavelength Division Multiplexing (WDM) optical embodiment of an interconnect structure, the level of quality-of-service is indicated by the presence or absence of QOS wavelengths.

While the invention has been described with reference to various embodiments, it will be understood that these embodiments are illustrative and that the scope of the invention is not limited to them. Many variations, modifications, additions and improvements of the embodiments described are possible. For example, those having ordinary skill in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims. For example, one of ordinary skill in the art could similarly apply the first and second quality-of-service techniques to the other interconnect structures described herein.

What is claimed is:

1. An interconnect structure comprising;
a plurality of interconnected nodes including distinct nodes A, B, C, and D;
data interconnect lines $AB_1$ and $AB_2$ coupled from the node A to the node B for sending data from the node A to the node B;
data interconnect lines $CD_1$ and $CD_2$ coupled from the node C to the node D for sending data from the node C to the node D;
a data interconnect line AD coupled from the node A to the node D for sending data from the node A to the node D;
means for detecting a condition at the node C;
means for sending a control signal CS from the node C to the node A, the control signal being determined at least in part by the condition at the node C; and
means for sending a message M arriving at the node A to the node B or the node D on a data interconnect line selected from among the data interconnect lines $AB_1$, $AB_2$, and AD depending at least partly on the control signal CS; wherein
the condition at the node C, depending at least in part on quality of service of messages, if any, passing from the node C to the node D, manages sending of messages from the node A to the node D.

2. An interconnect structure according to claim 1 wherein:
the control signal CS is carried from the node C to the node A on a control interconnect line from the node C to the node A.

3. An interconnect structure according to claim 2 wherein:
every output port reachable from the node A is reachable from the node C; and
an output port that is reachable from node A and is not reachable from the node B.

4. An interconnect structure according to claim 1 wherein:
the line AD passes directly from the node A to the node D.

5. An interconnect structure according to claim 1 wherein:
the line AD passes through a node between the node A and the node D on the line AD.

6. An interconnect structure according to claim 1 wherein:
when the condition at the node C is that the node C sends a message on each line from the node C to the node D, then the node A can send no messages to the node D.

7. An interconnect structure according to claim 1 wherein:
when a message M is sent from the node A to the node D, then the message M is selected from a message set R containing each message at the node A that can reach the target of the message M through the node D.

8. An interconnect structure according to claim 7 wherein:
no message in the message set R has a higher level of QOS than the message M.

9. An interconnect structure according to claim 8 wherein:
a message in the message set R with the same level of QOS as the message M is not sent to the node D based on information from the node A.

10. An interconnect structure comprising:
a plurality of interconnected nodes including distinct nodes A, B, C, and D;
data interconnect lines $AB_1$ and $AB_2$ coupled from the node A to the node B for sending data from the node A to the node B;

data interconnect lines $CD_1$ and $CD_2$ coupled from the node C to the node D for sending data from the node C to the node D;

a data interconnect line AD coupled from the node A to the node D for sending data from the node A to the node D;

means for detecting a condition at the node C;

means for sending a control signal CS from the node C to the node A, the control signal being determined at least in part by the condition at the node C; and means for sending a message M arriving at the node A to the node B or the node D on a data interconnect line selected from among the data interconnect lines $AB_1$, $AB_2$, and AD depending at least partly on the control signal CS: wherein the condition at the node C, depending at least in part on quality of services of messages, if any, passing from the node C to the node D, manages sending of messages from the node A to the node D; wherein when a message M is sent from the node A to the node D, then the message M is selected from a message set R containing each message at the node A that can reach the target of the message M through the node D;

no message in the message set R has a higher level of QOS than the message M; and the message M is selected at the node A from the message set R for sending to the node D based on the level of QOS and the node last visited prior to arrival at the node A of the messages in the message set R.

11. An interconnect structure comprising:

a plurality of interconnected nodes including distinct nodes A, B, C, and D;

data interconnect lines $AB_1$ and $AB_2$ coupled from the node A to the node B for sending data from the node A to the node B;

data interconnect lines $CD_1$ and $CD_2$ coupled from the node C to the node D for sending data from the node C to the node D;

a data interconnect line AD coupled from the node A to the node D for sending data from the node A to the node D;

means for detecting a condition at the node C;

means for sending a control signal CS from the node C to the node A, the control signal being determined at least in part by the condition at the node C; and means for sending a message M arriving at the node A to the node B or the node D on a data interconnect line selected from among the data interconnect lines $AB_1$, $AB_2$, and AD depending at least partly on the control signal CS, wherein:

when the condition at the node C is that no messages are moving from the node C to the node D and implicit in a message M at the node A is a condition that a path exists from the node D to a target destination of the message M and the message M has a level of quality of service not less than the threshold of quality of service for the node A to send a message to the node D, then the node A routes the message from the node A to the node D.

12. An interconnect structure comprising:

a plurality of interconnected nodes including distinct nodes A, B, C, and D;

data interconnect lines $AB_1$ and $AB_2$ coupled from the node A to the node B for sending data from the node A to the node B;

data interconnect lines $CD_1$ and $CD_2$ coupled from the node C to the node D for sending data from the node C to the node D;

a data interconnect line AD coupled from the node A to the node D for sending data from the node A to the node D;

means for detecting a condition at the node C;

means for sending a control signal CS from the node C to the node A, the control signal being determined at least in part by the condition at the node C; and means for sending a message M arriving at the node A to the node B or the node D on a data interconnect line selected from among the data interconnect lines $AB_1$, $AB_2$, and AD depending at least partly on the control signal CS, wherein:

when the condition at the node C is that a low quality of service (LQOS) message is sent from the node C to the node D and no other message is sent from the node C to the node D then the node A can send a high quality of service (HQOS) message to the node D so long as a HQOS message M is present at the node A and a path exists through the node A to an acceptable output port for the message M.

13. An interconnect structure comprising:

a plurality of interconnected nodes including distinct nodes A, B, C, and D;

data interconnect lines $AB_1$ and $AB_2$ coupled from the node A to the node B for sending data from the node A to the node B;

data interconnect lines $CD_1$ and $CD_2$ coupled from the node C to the node D for sending data from the node C to the node D;

a data interconnect line AD coupled from the node A to the node D for sending data from the node A to the node D;

means for detecting a condition at the node C;

means for sending a control signal CS from the node C to the node A, the control signal being determined at least in part by the condition at the node C; and means for sending a message M arriving at the node A to the node B or the node D on a data interconnect line selected from among the data interconnect lines $AB_1$, $AB_2$, and AD depending at least partly on the control signal CS, wherein:

when the condition at the node C is that a high quality-of-service (HQOS) message is sent from the node C to the node D and no other message is sent from the node C to the node D, then the node A can send either a high quality-of-service (HQOS) or low quality-of-service (LQOS) message from the node A to the node D so long as a message M is present at the node A such that the quality of service of the message M exceeds the minimum quality of service level for sending messages from the node A to the node D and a path exists from the node D to an acceptable output port for the message M.

14. An interconnect structure comprising:

a plurality of interconnected nodes including distinct nodes A, B, C, and D;

data interconnect lines $AB_1$ and $AB_2$ coupled from the node A to the node B for sending data from the node A to the node B;

data interconnect lines $CD_1$ and $CD_2$ coupled from the node C to the node D for sending data from the node C to the node D;

a data interconnect line AD coupled from the node A to the node D for sending data from the node A to the node D;

means for detecting a condition at the node C;

means for sending a control signal CS from the node C to the node A, the control signal being determined at least in part by the condition at the node C; and means for sending a message M arriving at the node A to the node B or the node D on a data interconnect line selected from among the data interconnect lines $AB_1$, $AB_2$, and AD depending at least partly on the control signal CS, wherein:

wherein when the condition at the node C is that a high quality-of-service (HQOS) message and a low quality-of-service (LQOS) message are sent from the node C to the node D, then the node C sends the high quality-of-service (HQOS) message on the data interconnect line $CD_1$ and the low quality-of-service (LQOS) message on the data interconnect line $CD_2$.

15. A communication interconnect structure comprising;

a plurality of nodes including distinct nodes A, C, and D;

a plurality of interconnect lines coupling the nodes, the node D having one or more message input interconnect lines coupled to the node A and one or more message interconnect lines coupled to the node C; and a logic that enforces priority relationship rules, the priority relationship rules including:

rules governing the sending of messages from the nodes A and C to the node D so that for a message MA arriving at node A and a message MC arriving at node C, the message MC is not blocked from traveling to node D by the message MA; and rules governing the sending of messages from the node A to the node D depending at least in part on quality of service levels of messages at node A, wherein the rules governing the sending of messages from the node A to the node D depend at least in part on the quality of service levels of each of the messages that are sent from the node C to the node D.

16. A communication interconnect structure according to claim 15 wherein:

the rules governing the sending of messages from the node A to the node D depend at least in part on the number of messages that the node C sends to the node D.

17. A communication interconnect structure according to claim 15 wherein:

the rules governing the sending of messages from the node A to the node D depend at least in part on routing by the node D of message arriving at a node subsequent to the node D.

18. A communication interconnect structure according to claim 17 wherein:

one or more messages N exist so that when the node C sends a message N to the node D, then the node A is not allowed to send messages to the node D.

19. A communication interconnect structure according to claim 15 wherein:

the logic that determines the priority relationship associates a threshold value $T_0(A,D)$ with the pair of nodes A and D; and the rules specify that when the node C sends no messages to the node D then the node A sends a message from the node A to the node D so long as a message M at the node A has a quality of service level greater than $T_0(A,D)$ and a path exists from the node D to a target of the message M.

20. A communication interconnect structure according to claim 15 wherein:

the rules specify that when the node C sends no messages to the node D then the node A sends a message from the node A to the node D so long as a message M is present at the node A and a path exists from the node D to a target of the message M.

21. A communication interconnect structure according to claim 15 wherein:

the rules specify that when the node C sends one low quality-of-service (LQOS) message to the node D and no other message to the node D, the node A sends one high quality-of-service (HQOS) message to the node D so long as a high quality-of-service (HQOS) message M is present at the node A and a path exists through the node D to a acceptable output port of the message M.

22. A communication interconnect structure according to claim 15 wherein:

the rules specify that when the node C sends one high quality-of-service (HQOS) message to the node D and no other message to the node D, the node A sends a message to the node D so long as a message M exists at the node A and a path exists through the node D to an acceptable output port of the message M.

23. A communication interconnect structure according to claim 15 wherein:

the logic that determines the priority relationship associates a threshold value $T_0(A,D)$ with the pair of nodes A and D; and the rules specify that when the node C sends one high quality-of-service (HQOS) message to the node D, the node A sends a message to the node D so long as a message M exists at the node A such that a path exists through the node D to an acceptable output port of the message M and the quality of service level of the message M is not less than $T_0(A,D)$.

24. A communication interconnect structure according to claim 15 wherein:

the rules specify that when the node C sends one low quality-of-service (LQOS) message to the node D and no other messages to the node D, a high quality-of-service (HQOS) message is sent from the node A to the node D so long as a high quality-of-service (HQOS) message M is available at the node A and the message M can reach an acceptable port of the message M through the node D.

25. A communication interconnect structure according to claim 15 wherein:

the rules specify that when the node C sends two messages to the node D, then no message is sent from the node A to the node D.

26. A communication interconnect structure according to claim 15 wherein:

the rules specify that when the node A sends two messages to the node D, then a message may be sent from the node A to the node D so long as logic that enforces priority relationship rules including logic governing the flow of data through the node A is informed that one or more of the messages traveling from the node A to the node D will be routed through the node D to a node X whereby an output port that is reachable from the node D is not reachable from the node X.

27. A communication interconnect structure according to claim 15 wherein the interconnect structure is an hierarchical interconnect structure with messages passing from a previous level to a subsequent level, the nodes C and D being on a level subsequent to the level of the node A, the interconnect structure further comprising:
  a data interconnect line $A_1$ coupled to the node A for receiving high quality-of-service data at the node A from a source on the same level as the node A;
  a data interconnect line $A_2$ coupled to the node A for receiving low quality-of-service data at the node A from a source on the same level as the node A;
  a data interconnect line $A_3$ coupled to the node A for receiving data at the node A from a source on a previous level to level of the node A; and
  a logic associated with the node A that selects messages for transmission to the node D from a message set arriving at the node A for sending from the node A to the node D when the condition at the node C permits a message to be sent to the node D from the node A.

28. A communication interconnect structure according to claim 27 wherein:
  the logic associated with the node A selects a high quality-of-service (HQOS) message arriving at the node A on the data interconnect line $A_1$ over any other messages in the message set.

29. A communication interconnect structure according to claim 27 wherein:
  the logic associated with the node A selects a high quality-of-service (HQOS) message arriving at the node A on the data interconnect line $A_2$ in the absence of a high quality-of-service (HQOS) message arriving at the node A on the data interconnect line $A_1$.

30. A communication interconnect structure according to claim 27 wherein:
  the logic associated with the node A selects a high quality-of-service (HQOS) message arriving at the node A on the data interconnect line $A_3$ in the absence of a high quality-of-service (HQOS) message arriving at the node A on the data interconnect line $A_1$ or on the data interconnect line $A_2$.

31. A communication interconnect structure according to claim 27 wherein:
  the logic associated with the node A selects a low quality-of-service (LQOS) message arriving at the node A on the data interconnect line $A_2$ in the absence of a high quality-of-service (HQOS) message arriving at the node A.

32. A communication interconnect structure according to claim 27 wherein:
  the logic associated with the node A selects a low quality-of-service (LQOS) message arriving at the node A on the data interconnect line $A_3$ in the absence of a high quality-of-service (HQOS) message arriving at the node A or a low quality-of-service (LQOS) message arriving at the node A on the data interconnect line $A_2$.

33. A communication interconnect structure according to claim 27 further comprising:
  a data interconnect line $A_4$ coupled to the node A for receiving data at the node A from a source on a previous level to level of the node A.

34. A communication interconnect structure according to claim 33 wherein:
  the logic associated with the node A selects a high quality-of-service (HQOS) message arriving at the node A on the data interconnect line $A_4$ in the absence of a high quality-of-service (HQOS) message arriving at the node A on the data interconnect line $A_1$, the data interconnect line $A_2$, or the data interconnect line $A_3$.

35. A communication interconnect structure according to claim 33 wherein:
  the logic associated with the node A selects a low quality-of-service (LQOS) message arriving at the node A on the data interconnect line $A^4$ in the absence of a high quality-of-service (HQOS) message arriving at the node A or a low quality-of-service (LQOS) message arriving at the node A on the data interconnect line $A_2$ or on the data interconnect line $A_3$.

36. An interconnect apparatus, comprising:
  a plurality of nodes; and
  a plurality of interconnect lines selectively coupling the nodes in a hierarchical multiple level structure with the level of a node being determined entirely by the position of the node in the structure in which data moves unilaterally from a source level to a destination level or laterally along a level of the multiple level structure, a plurality of data messages including high quality-of-service (HQOS) messages and low quality-of-service (LQOS) messages being transmitted through the multiple level structure from a source node to a designated destination node, a level of the multiple level structure including:
  one or more groups of nodes, the data messages being transmitted to a group of the one or more groups of nodes on a path to a target, the group of the one or more groups including:
    a plurality of nodes, a single data message being transmitted to a node N of the plurality of nodes of a group unilaterally toward the destination level if the node is not blocked and otherwise one or more data messages being transmitted laterally if the node is blocked, the data messages being transmitted based at least partly on quality of service of the messages whereby a threshold quality of service for level advancement depends on position of a transmitting node.

37. A network communicating messages in a sequence of discrete time steps, the network comprising:
  a plurality of nodes, the nodes including communication devices that receive messages and send messages, the messages including high quality-of-service (HQOS) messages and low quality-of-service (LQOS) messages; and
  a plurality of interconnect lines L interconnecting communication devices at the plurality of nodes, a node N of the plurality of nodes including:
    a connection to one or more interconnect lines $L_{UN}$ capable of transmitting a plurality of messages from a device U to the node N;
    a connection to an interconnect line $L_{VN}$ for transmitting a message from a device V to the node N;
  the network having a precedence relationship $P_N(U, V)$ relating to the node N and the devices U and V such that the device U has precedence over the device V in sending a message to the node N so that for one or more messages $M_U$ at the device U that are directed to the node N via the interconnect lines $L_{UN}$ at a time step t and a message $M_V$ at the device V that is directed to the node N via the interconnect line $L_{VN}$ also at a time step t, the one or more messages $M_U$ are successfully sent to the node N and the node V uses a control signal to decide where to send the message $M_V$, the precedence relationship $P_N(U, V)$ being determined at least partly by quality of service of the messages whereby a threshold quality of service for level advancement depends on position of a transmitting node.

38. A network comprising:

a plurality of nodes N; and a plurality of interconnect lines L connecting the plurality of nodes N in a predetermined pattern, the interconnect lines carrying messages M and control signals C, the messages including high quality-of-service (HQOS) messages and low quality-of-service (LQOS) messages, one or more messages $M_x$ of the messages M and a control signal $C_x$ of the control signals C being received by a node of the plurality of nodes at a discrete time step t and the messages M being moved to subsequent nodes of the plurality of nodes in an immediately subsequent discrete time step t+1, the plurality of interconnect lines L connecting the plurality of nodes N to include:

a node A having a message input interconnection for receiving a message $M_A$, a control input interconnection for receiving a control signal $C_A$, a direct message output interconnection to a node D, a plurality of direct message output interconnections to a node E, a direct control output interconnection to a device G, and a control logic for determining whether the message $M_A$ is sent to the node D or the node E based on:

(1) the control signal CA;

(2) a location of the node A within the plurality of interconnect lines L; and (3) a routing information contained in the message $M_A$, the routing information including an indication of quality of service.

39. A network capable of carrying a plurality of messages M concurrently, the messages including high quality-of-service (HQOS) messages and low quality-of-service (LQOS) messages, the network comprising:

a plurality of output ports P;

a plurality of nodes N, the individual nodes N including a plurality of direct message input interconnections and a plurality of direct message output interconnections, the individual nodes N for passing messages M to predetermined output ports of the plurality of output ports P, the predetermined output ports P being designated by the messages M; and a plurality of interconnect lines in an interconnect structure selectively coupling the nodes in a hierarchical multiple level structure arranged to include a plurality of J+1 levels in an hierarchy of levels arranged from a lowest destination level $L_0$ to a highest level $L_J$ which is farthest from the lowest destination level $L_0$, the output ports P being connected to nodes at the lowest destination level $L_0$, the level of a node being determined entirely by the position of the node in the structure, the network including a node A of the plurality of nodes N, a control signal operating to limit the number of messages that are allowed to be sent to the node A to eliminate contention for the predetermined output ports of the node A so that the messages M are sent through the direct message output interconnections of the node A to nodes H that are a level L no higher than the level of the node A, the nodes H being on a path to the designated predetermined output ports P of the messages M, the control signal being determined at least partly according to message quality of service whereby a threshold quality of service for level advancement depends on position of the node A.

40. An interconnect apparatus, comprising:

a plurality of nodes; and a plurality of interconnect lines in an interconnect structure selectively coupling the nodes in a hierarchical multiple level structure arranged to include:

a plurality of J+1 levels with J an integer greater than 0 in an hierarchy of levels arranged from a lowest destination level $L_0$ to a highest level $L_J$ with the level of a node being determined entirely by the position of the node in the structure, the interconnect structure transmitting a plurality of multiple-bit messages entering the interconnect structure unsorted through a plurality of input ports, individual messages M of the plurality of messages being self-routing and including high quality-of-service (HQOS) messages and low quality-of-service (LQOS) messages, the individual messages M moving in a plurality of ways including three ways which are sufficient for the messages M to exit the interconnect structure through an output port designated by the messages M, movement of the messages being determined by quality of service of messages M whereby a threshold quality of service for level advancement depends on the node position, the three ways being:

(1) each of the messages M enters a node in the interconnect structure from a device external to the interconnect structure, each of the messages M designating one or more designated output ports;

(2) each of the messages M moves through a node in the interconnect structure to a designated output port, a time T being associated with the node such that each of the messages M arriving at the node is selectively transmitted within the time T of the message's arrival at the node; and (3) each of the messages M moves either: (i) through a node U on a level $L_k$ of the interconnect structure to a different node V on the same level $L_k$ in combination with another message, if available, or (ii) moves through the node U on a level $L_k$ of the interconnect structure to a node W on a level $L_i$ nearer in the hierarchy to the destination level $L_0$ than the level $L_k$, a time $T_U$ being associated with the node U such that each of the messages M arriving at the node U is selectively transmitted within the time $T_U$ of the message's arrival at the node U.

41. An interconnect structure comprising:

a plurality of nodes; and a plurality of interconnect lines in an interconnect structure selectively coupling the nodes in a structure, the interconnect structure transmitting a plurality of multiple-bit messages entering the interconnect structure unsorted through a plurality of input ports, an individual message M of the plurality of messages being self-routing, the interconnect structure including:

a node E having a first data input interconnection from a node A and a second data input interconnection from a node F distinct from the node A; and a control interconnection between the node A and node F for carrying a control signal to resolve contention for sending messages to the node E, the control signal resolving contention at least partly on the basis of quality of service whereby a threshold quality of service for level advancement depends on position in the structure of the node A.

42. A method of moving messages through an interconnect structure comprising:
   providing:
      a plurality of nodes interconnected in a hierarchy including distinct nodes A, B, C, and D, the nodes A and B being on a level in the hierarchy and the nodes C and D being on a next level in the hierarchy;
      data interconnect lines $B_1$ and $B_2$ coupled from the node A to the node B for sending data from the node A to the node B;
      a data interconnect line $D_1$ coupled from the node C to the node D for sending data from the node C to the node D;
      a data interconnect line $D_2$ coupled from the node C to the node D for sending data from the node C to the node D;
      a data interconnect line $D_3$ coupled from the node A to the node D for sending data from the node A to the node D; and
      a control interconnect line S coupled from the node C to the node A for sending a control signal from the node C to the node A;
   detecting a condition at the node C;
   sending a control signal CS on the line S from the node C to the node A, the control signal being determined by the condition at the node C;
   sending a message M arriving at the node A to the node B or the node D on a data interconnect line selected from among the data interconnect lines $B_1$, $B_2$, and $D_3$ depending at least partly on the control signal CS; and
   responding to a condition at the node C of arrival of one or more messages M of defined quality of service by sending the one or more messages from the node C to the node D selectively on data interconnect lines $D_1$ or $D_2$ based on the defined quality of service.

43. A method according to claim 42 further comprising:
   sending the message M from the node A to the node D when the condition at the node C is that no messages are moving from the node C to the node D and a path exists from the node D to the target destination of the message M.

44. A method according to claim 42 further comprising:
   selecting the message M from among a message set R including high quality of service (HQOS) messages and low quality of service (LQOS) messages, the messages having a header including quality of service information and information specifying a target destination for ultimately receiving the message.

45. A method of moving messages through an interconnect structure comprising:
   providing:
      a plurality of nodes interconnected in a hierarchy including distinct nodes A, B, C, and D, the nodes A and B being on a level in the hierarchy and the nodes C and D being on a next level in the hierarchy
      data interconnect lines $B_1$ and $B_2$ coupled from the node A to the node B for sending data from the node A to the node B;
      a data interconnect line $D_1$ coupled from the node C to the node D for sending data from the node C to the node D;
      a data interconnect line $D_2$ coupled from the node C to the node D for sending data from the node C to the node D;
      a data interconnect line $D_3$ coupled from the node A to the node D for sending data from the node A to the node D; and
      a control interconnect line S coupled from the node C to the node A for sending a control signal from the node C to the node A;
   detecting a condition at the node C;
   sending a control signal CS on the line S from the node C to the node A, the control signal being determined by the condition at the node C;
   sending a message M arriving at the node A to the node B or the node D on a data interconnect line selected from among the data interconnect lines $B_1$, $B_2$, and $D_3$ depending at least partly on the control signal CS;
   when the condition at the node C is that a low quality of service (LQOS) message $M_{LQOS}$ arrives at the node C with no high quality of service (HQOS) message, sending the message $M_{LQOS}$ from the node C to the node D on the line $D_2$ for carrying low quality of service messages and sending the control signal CS on the control interconnect line S to indicate the condition,
   in response to the control signal CS indicative of the condition, the node A is capable of sending a high quality of service (HQOS) message $M_{HQOS}$ arriving at the node A to the node D on the line $D_3$ but is not capable of sending a LQOS message to the node D on the line $D_3$.

46. A method according to claim 45 further comprising:
   in response to the control signal CS indicative of the condition, the node A can send a LQOS message arriving at the node A to the node B on the line $B_2$.

47. A method of moving messages through an interconnect structure comprising:
   providing:
      a plurality of nodes interconnected in a hierarchy including distinct nodes A, B, C, and D, the nodes A and B being on a level in the hierarchy and the nodes C and D being on a next level in the hierarchy;
      data interconnect lines $B_1$ and $B_2$ coupled from the node A to the node B for sending data from the node A to the node B;
      a data interconnect line $D_1$ coupled from the node C to the node D for sending data from the node C to the node D;
      a data interconnect line $D_2$ coupled from the node C to the node D for sending data from the node C to the node D;
      a data interconnect line $D_3$ coupled from the node A to the node D for sending data from the node A to the node D; and
      a control interconnect line S coupled from the node C to the node A for sending a control signal from the node C to the node A;
   detecting a condition at the node C;
   sending a control signal CS on the line S from the node C to the node A, the control signal being determined by the condition at the node C;
   sending a message M arriving at the node A to the node B or the node D on a data interconnect line selected from among the data interconnect lines $B_1$, $B_2$, and $D_3$ depending at least partly on the control signal CS;
   when the condition at the node C is that a high quality of service (HQOS) message $M_{HQOS}$ arrives at the node C with no low quality of service (LQOS) message, sending the message $M_{HQOS}$ from the node C to the node D on the line $D_1$ for carrying high quality of service messages and sending the control signal CS on the control interconnect line S to indicate the condition,
   in response to the control signal CS indicative of the condition, the node A is capable of sending either a high quality of service (HQOS) message or a low quality of service (LQOS) message arriving at the node A to the node D on the line $D_3$.

48. A method of moving messages through an interconnect structure comprising:
providing:
a plurality of nodes interconnected in a hierarchy including distinct nodes A, B, C, and D, the nodes A and B being on a level in the hierarchy and the nodes C and D being on a next level in the hierarchy;
data interconnect lines $B_1$ and $B_2$ coupled from the node A to the node B for sending data from the node A to the node B;
a data interconnect line $D_1$ coupled from the node C to the node D for sending data from the node C to the node D;
a data interconnect line $D_2$ coupled from the node C to the node D for sending data from the node C to the node D;
a data interconnect line $D_3$ coupled from the node A to the node D for sending data from the node A to the node D; and
a control interconnect line S coupled from the node C to the node A for sending a control signal from the node C to the node A;
detecting a condition at the node C;
sending a control signal CS on the line S from the node C to the node A, the control signal being determined by the condition at the node C;
sending a message M arriving at the node A to the node B or the node D on a data interconnect line selected from among the data interconnect lines $B_1$, $B_2$, and $D_3$ depending at least partly on the control signal CS;
when the condition at the node C is that a high quality of service (HQOS) message $M_{HQOS}$ and a low quality of service (LQOS) message $M_{LQOS}$ simultaneously arrive at the node C, sending the message $M_{HQOS}$ from the node C to the node D on the line $D_1$ for carrying high quality of service messages, sending the message $M_{LQOS}$ to the node D on the line $D_2$ for carrying low quality of service messages, and sending the control signal CS on the control interconnect line S to indicate the condition,
in response to the control signal CS indicative of the condition, the node A sends neither a high quality of service (HQOS) message nor a low quality of service (LQOS) message arriving at the node A to the node D on the line $D_3$.

49. A method according to claim 48 further comprising:
in response to the control signal CS indicative of the condition, the node A can send a HQOS message and/or a LQOS message arriving at the node A to the node B.

50. An interconnect structure for communicating data in packets, the interconnect structure comprising:
a collection of nodes including distinct nodes A, B, C, and D;
a collection of interconnect lines selectively coupling the nodes of the interconnect structure, and
a logic for routing packets through the interconnect structure so that:
the node A is capable of sending packets to the node B or the node D; and
for a packet PA arriving at the node A and a packet PC arriving at the node C, the node C has routing priority over the node A to send messages to the node D in which:
routing of the packet PA at the node A depends upon routing of the packet PC at the node C, and
routing of the packet PC at the node C depends at least partly on quality of service of the packet PC whereby a threshold quality of service for advancement through the interconnect structure depends on position in the interconnect structure of the node A.

51. An interconnect structure for communicating data in packets, the interconnect structure comprising:
a collection of nodes including distinct nodes A, B, C, and D;
a collection of interconnect lines selectively coupling the nodes of the interconnect structure, and
a logic for routing packets through the interconnect structure so that:
the node A is capable of sending packets to the node B or the node D; and
for a packet PA arriving at the node A and a packet PC arriving at the node C, the node C has routing priority over the node A to send messages to the node D in which:
routing of the packet PA at the node A depends upon routing of the packet PC at the node C, and
routing of the packet PC at the node C depends at least partly on a quality of service of the packet PC, wherein:
routing of the packet PC at the node C does not depend on routing of the packet PA at the node A;
the logic routes the packets depending at least in part on N quality of service threshold values $T_i(A,D)$ for routing data from the node A to the node D, the number N being two or more, the threshold values $T_i(A,D)$ being increasing in value from $T_0(A,D)$ to $T_{N-1}(A,D)$;
the collection of interconnect lines including control signal lines for carrying control signal information $CS(0)$ to $CS(N-1)$ corresponding to the threshold values $T_0(A,D)$ to $T_{N-1}(A,D)$;
a plurality of nodes are capable of sending control signals $CS(i)$ to the node A;
on receipt of control information $CS(j)$ at the node A, j being between 0 and N−1, if a packet PA is present at the node A, a path exists through the node D to an acceptable target of the packet PA, and the level of QOS for the node A is at least $T_j(A,D)$, then the node A will send a packet to the node D.

52. An interconnect structure according to claim 51 wherein:
the logic routes the packets depending at least in part on N quality of service threshold values $T_i(A,D)$ for routing data from the node A to the node D including the threshold values $T_0(A,D)$ and $T_1(A,D)$;
the collection of interconnect lines including control signal lines for carrying control signal information $CS(i)$ corresponding to the threshold values $T_i(A,D)$ including the control signal information $CS_0(A,D)$ and $CS_1(A,D)$; and
in the presence of control signal information $CS_N(A,D)$, if a packet PA exists at the node A, a path exists through the node D to an acceptable output port of the packet PA, and the level of QOS for the packet PA is at least $T_N(A,D)$, then the node A sends a packet to the node D.

53. An interconnect structure according to claim 51 wherein:
the control signal information $CS(i)$ sent by the plurality of control signal sending nodes depends at least partially upon the routing of messages through the node C.

54. An interconnect structure according to claim 51 wherein:

the control signal information CS(i) sent by the plurality of control signal sending nodes depends at least partially upon the future routing of messages through the node D.

55. An interconnect structure comprising:

a plurality of nodes including the distinct nodes A, B, C, and D;

a collection of lines selectively coupling the nodes of the interconnect structure, including one or more data carrying lines allowing the node A to send messages to the node B, one or more data carrying lines allowing the node A to send data to the node D, and one or more data carrying lines allowing for the node C to send data to the node D; and a logic for routing packets through the interconnect structure so that:

a message $M_C$ arriving at the node C is not blocked from being routed to the node D by a message MA arriving at the node A;

messages arriving at the node A are routed by a logic associated with the node A to other nodes in the interconnect structure; and the logic at node A uses quality of service information from the messages arriving at node A whereby a threshold quality of service for advancement through the interconnect structure depends on position of the node A in the structure at least in part to route the messages arriving at node A to other nodes in the interconnect structure.

* * * * *